United States Patent
Shimizu et al.

(10) Patent No.: US 8,663,871 B2
(45) Date of Patent: Mar. 4, 2014

(54) RESIN COMPOSITION FOR FUEL CELL SEPARATOR, PROCESS FOR PRODUCING SAME, AND FUEL CELL SEPARATOR

(75) Inventors: Takayoshi Shimizu, Shizuoka (JP); Atsushi Murakami, Shizuoka (JP)

(73) Assignee: Nichias Corporation, Tokyo (JP)

( * ) Notice: Subject to any disclaimer, the term of this patent is extended or adjusted under 35 U.S.C. 154(b) by 689 days.

(21) Appl. No.: 12/935,697

(22) PCT Filed: Jul. 29, 2009

(86) PCT No.: PCT/JP2009/063476
§ 371 (c)(1), (2), (4) Date: Sep. 30, 2010

(87) PCT Pub. No.: WO2010/013740
PCT Pub. Date: Feb. 4, 2010

(65) Prior Publication Data
US 2011/0027695 A1   Feb. 3, 2011

(30) Foreign Application Priority Data
Aug. 1, 2008 (JP) .............................. P.2008-199277

(51) Int. Cl.
*H01M 8/04* (2006.01)
*C08K 3/04* (2006.01)

(52) U.S. Cl.
USPC .......................................... 429/514; 524/496

(58) Field of Classification Search
USPC ........................................... 429/514; 524/496
See application file for complete search history.

(56) References Cited

U.S. PATENT DOCUMENTS

| 2003/0235750 A1* | 12/2003 | Tanno ............................. 429/38 |
| 2006/0240303 A1* | 10/2006 | Okumura et al. ................ 429/34 |
| 2009/0148775 A1 | 6/2009 | Murakami et al. |

FOREIGN PATENT DOCUMENTS

| EP | 1 995 810 A1 | 11/2008 |
| JP | 2001-52721 | 2/2001 |
| JP | 2001-126744 | 5/2001 |
| JP | 2002-201257 | 7/2002 |
| JP | 2003-128929 | 5/2003 |

(Continued)

OTHER PUBLICATIONS

Notification of First Action and English translation in CN 200980103501.X dated Nov. 28, 2012.

(Continued)

*Primary Examiner* — Mark F Huff
*Assistant Examiner* — Monique Wills
(74) *Attorney, Agent, or Firm* — Nixon & Vanderhye P.C.

(57) ABSTRACT

A fuel cell separator is produced by forming a fuel cell separator resin composition including, as essential components, (A) an epoxy resin; (B) a curing agent; (C) a curing accelerator; and (D) a carbon material, in which the content of the (D) is 50 to 85% by mass based on the total amount of the composition, in which the (D) includes high crystalline artificial graphite having an average particle size of 100 μm or more and less than 150 μm in an amount of 5 to 100% by mass based on the total amount of the (D), and in which the content of the (C) is 0.1 to 20 parts by weight per 100 parts by weight of the (B). The resin composition is excellent in electric conductivity and fluidity and contains little impurities, and can provide a fuel cell separator which is excellent in electric conductivity and dimensional accuracy, and has no fear of causing deterioration in performance of a solid electrolyte.

8 Claims, 1 Drawing Sheet

(56) References Cited

FOREIGN PATENT DOCUMENTS

| | | |
|---|---|---|
| JP | 2003-242994 | 8/2003 |
| JP | 2003-242995 | 8/2003 |
| JP | 2003-257447 | 9/2003 |
| JP | 2003-297386 | 10/2003 |
| JP | 2003-338294 | 11/2003 |
| JP | 2005-197222 | 7/2005 |
| JP | 2006-137809 | 6/2006 |
| JP | 2006-152170 | 6/2006 |
| JP | 2006-199812 | 8/2006 |
| JP | 2006-210223 | 8/2006 |
| JP | 2006-252170 | 9/2006 |
| JP | 2006-260956 | 9/2006 |
| JP | 2007-179945 | 7/2007 |
| JP | 2008-016307 | 1/2008 |
| JP | 2008-41444 | 2/2008 |
| JP | 2008-204895 | 9/2008 |
| JP | 2008-291132 | 12/2008 |
| JP | 2009-110944 | 5/2009 |

OTHER PUBLICATIONS

Extended European Search Report in EP 09 80 2982 dated Nov. 29, 2011.
International Search Report for PCT/JP2009/063476, mailed Oct. 27, 2009.
Notification of Reasons for Refusal (with English language translation) in JP 2008-199277 mailed Apr. 2, 2013.

\* cited by examiner

RESIN COMPOSITION FOR FUEL CELL SEPARATOR, PROCESS FOR PRODUCING SAME, AND FUEL CELL SEPARATOR

This application is the U.S. national phase of International Application No. PCT/JP2009/063476, filed 29 Jul. 2009, which designated the U.S. and claims priority to Japanese Patent Application No. 2008-199277, filed 1 Aug. 2008, the entire contents of each of which are hereby incorporated by reference.

TECHNICAL FIELD

The present invention relates to a fuel cell separator and a resin composition as a molding material therefor.

BACKGROUND ART

Figure 1:
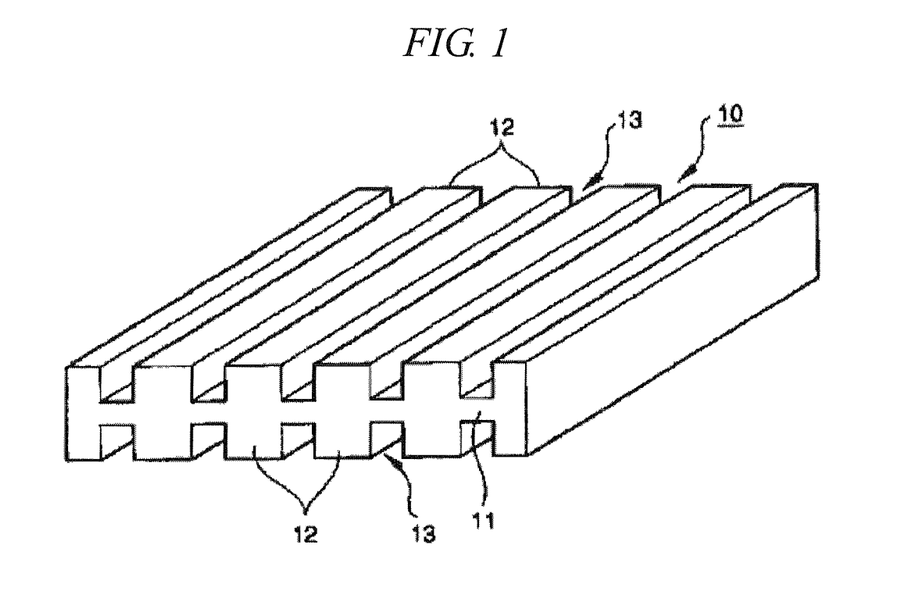
FIG. 1 is a perspective view showing one embodiment of a fuel cell separator.

As shown, for example, in a schematic perspective view in FIG. 1, a fuel cell separator 10 is formed by providing a plurality of partition walls 12 in a protruding state at predetermined intervals on both sides of a flat plate portion 11. In order to form a fuel cell, a number of fuel cell separators 10 are laminated along the protruding direction (the vertical direction in the figure) of the partition walls 12. By this lamination, a constitution is realized, wherein reactive gas (hydrogen or oxygen) is allowed to flow through channels 13 formed by pairs of adjacent partition walls 12. The fuel cell separator is produced by molding a resin composition containing a resin material and a conductive material such as graphite into the above-mentioned shape.

As a method for forming the fuel cell separator, there is generally used a method in which the composition containing a thermosetting resin such as a phenol resin or an epoxy resin as the resin material is placed in a mold provided with flow paths for gas or cooling water, and molded by heat compression molding in which the composition is hot pressed. However, in recent years, in order to improve productivity, it has been tried to produce the fuel cell separator by injection molding, instead of heat compression molding. For example, there is known a method of injecting a resin composition containing a graphite material and a thermoplastic or thermosetting resin from a cylinder into a mold, thereby forming a fuel cell separator (see Patent Documents 1 to 3). In such injection molding, the resin composition is transferred to the closed mold through a narrow passage called a runner. When the resin composition has low fluidity, a short shot occurs in which a part of the mold can not be filled or high pressure is required for filling, so that the inner pressure of the mold increases to cause deformation of the mold, leading to deterioration of dimensional accuracy of a molded article, in some cases. Accordingly, in order to fill the mold without clearance with the resin composition to obtain a molded article having high dimensional accuracy, the resin composition is required to have high fluidity.

On the other hand, an epoxy resin has been widely used as a resin material. However, a curing agent and a curing accelerator are necessary to cure the epoxy resin, and an organic phosphine such as triphenylphosphine has been generally used as the curing accelerator (see Patent Document 4). However, only a fuel cell separator having low conductivity is obtained from the resin composition using the organic phosphine as the curing accelerator. In particular, when artificial graphite is used as the carbon material and triphenylphosphine as the curing accelerator is used in combination therewith, conductivity deteriorates. Moreover, when natural graphite is used as the carbon material, impurities of metal components are contained in large amounts, which sometimes adversely affect an electrolyte membrane used in a fuel cell.

Consequently, it has been tried to use a urea compound as the curing accelerator (see Patent Documents 5 and 6). However, with regard to the resin composition described in Patent Document 5, fluidity as a material is poor and the composition cannot be molded by injection molding in the tracing experiments done by the present inventors. Moreover, in the resin composition described in Patent Document 6, expanded graphite is used as the carbon material, and impurities derived therefrom are contained in large amounts, which possibly adversely affect the electrolyte membrane.

As described above, a fuel cell separator resin composition excellent in conductivity and fluidity and containing little impurities has not been obtained by the conventional technique.

BACKGROUND ART DOCUMENTS

Patent Documents

Patent Document 1: JP-A-2001-338294
Patent Document 2: JP-A-2003-297386
Patent Document 3: JP-A-2003-242994
Patent Document 4: JP-A-2003-257447
Patent Document 5: JP-A-2002-201257
Patent Document 6: JP-A-2006-252170

SUMMARY OF THE INVENTION

Problems that the Invention is to Solve

The invention has been made in view of the above-mentioned circumstances, and an object thereof is to provide a fuel cell separator resin composition excellent in conductivity and fluidity and containing little impurities. Moreover, another object of the invention is to provide a fuel cell separator excellent in conductivity and dimensional accuracy and having no fear of causing deterioration in performance of a solid electrolyte.

Means for Solving the Problems

In order to achieve the above-mentioned objects, the invention provides a fuel cell separator resin composition comprising, as essential components:

(A) an epoxy resin;
(B) a curing agent;
(C) a curing accelerator; and
(D) a carbon material, wherein the content of the (D) is from 50 to 85% by mass based on the total amount of the composition, wherein the (D) comprises high crystalline artificial graphite having an average particle size of 100 μm or more and less than 150 μm in an amount of 5 to 100% by mass based on the total amount of the (D), wherein the content of the (C) is from 0.1 to 20 parts by weight per 100 parts by weight of the (B), and wherein the (C) is any one of the following (i) to (v):

(i) a phosphorus compound represented by the following general formula (I) or (II) and having a molecular weight of 300 to 1,000:

[Chem. 1]

wherein R1 to R4 are the same or different and represent each a functional group selected from hydrogen, an alkyl group, an aralkyl group and an aryl group or a derivative thereof; and X is a substance selected from a tetradentate boron compound, a halogen atom and a hexadentate antimony compound;

(ii) a salt of a diazabicyclo compound with an organic acid;

(iii) a urea derivative represented by the general formula "X—NH—CO—NYZ, in which X is one kind selected from a saturated or unsaturated alkyl group and a derivative thereof and an aryl group and a derivative thereof, and Y and Z may be the same or different and are each a saturated or unsaturated alkyl group";

(iv) an imidazole compound having a molecular weight of 100 or more; and (v) a tertiary amine compound having a molecular weight of 120 to 1,000.

Also, the invention provides a method for producing a fuel cell separator resin composition, the method comprising performing melt kneading of the (A) to the (D) at a temperature equal to or higher than a softening temperature of the (A) or the (B) and at a temperature at which a curing reaction does not proceeds during mixing as well as a fuel cell separator produced by injection molding of the above-mentioned fuel cell separator resin composition.

Advantage of the Invention

In the fuel cell separator resin composition of the invention, a specific curing accelerator is used, so that fluidity is not decreased to make injection molding possible. Moreover, the carbon material contains high crystalline artificial graphite as a main component, so that the resin composition is excellent in conductivity, and further contains little impurities, resulting in no fear of causing deterioration in performance of a solid electrolyte. Accordingly, the fuel cell separator of the invention is also excellent in dimensional accuracy and conductivity, and further causes no deterioration in performance of the solid electrolyte. Thus, a high-performance fuel cell is obtained.

MODE FOR CARRYING OUT THE INVENTION

The following will describe the present invention in detail.

The fuel cell separator resin composition (hereinafter simply referred to as a resin composition) of the invention comprises (A) an epoxy resin, (B) a curing agent, (C) a curing accelerator and (D) a carbon material as essential components.

The epoxy resin is a compound having two or more epoxy groups, and a conventionally known one can be used. Examples of the epoxy resin include but are not limited to bisphenol type epoxy resins such as a bisphenol A type epoxy resin, a bisphenol F type epoxy resin, a bisphenol AF type epoxy resin, a bisphenol S type epoxy resin, a hydrogenated bisphenol A type epoxy resin and a halogenated bisphenol A type epoxy resin; multifunctional epoxy resins such as a phenol novolak type epoxy resin, a cresol novolak type epoxy resin, a bisphenol A novolak type epoxy resin, a tris-hydroxyphenylmethane type epoxy resin, a phenol dicyclopentadiene type epoxy resin, a halogenated phenol novolak type epoxy resin, a naphthol novolak type epoxy resin, resorcin epoxide and a tetraphenylol ethane type epoxy resin; cyclic epoxy resins; biphenyl type epoxy resins; naphthalene type epoxy resins; glycidyl ester type epoxy resins and glycidyl amine type epoxy resins. Of the above-mentioned epoxy resins, multifunctional epoxy resins are suitably used in the invention, because a molded article having high heat resistance and strength is obtained. The epoxy equivalent is preferably from 50 to 500, and more preferably from 100 to 300. When the epoxy equivalent is too low, a molded article becomes brittle. On the other hand, when the epoxy equivalent is too high, only a molded article having low heat resistance and strength is obtained.

The epoxy resin reacts with the curing agent to form an epoxy-cured product. Various known compounds can be used as the curing agent. Examples thereof include but are not limited to aliphatic, alicyclic and aromatic polyamines such as diethylenetriamine, triethylenetetramine, tetraethylenepentamine, menthenediamine, isophoronediamine, N-aminoethylpiperazine, m-xylenediamine and diaminodiphenylmethane or carbonates thereof; acid anhydrides such as phthalic anhydride, methyltetrahydrophthalic anhydride, methylhexahydrophthalic anhydride, methylnadic anhydride, dodecylsuccinic anhydride, pyromellitic anhydride, benzophenonetetracarboxylic anhydride, trimellitic anhydride and polyazelaic anhydride; polyphenols such as phenol novolak and cresol novolak; and polymercaptan. A plurality of the curing agents can also be used in combination. Of the above-mentioned curing agents, the curing agents such as polyamines or carbonates thereof, acid anhydrides, polyphenols and polymercaptan are called a polyaddition type curing agent, because they themselves react with an epoxy compound by a polyaddition reaction to constitute the epoxy-cured product. An excess or deficiency of the polyaddition type curing agent leads to the remaining of unreacted functional groups, so that the amount thereof added has an appropriate range. In general, the polyaddition type curing agent is preferably used in an amount of 0.7 to 1.2 equivalent weights, and particularly in an amount of 0.8 to 1.1 equivalent weights per epoxy group of an epoxy resin precursor. The curing rate of the thermosetting resin can be arbitrarily changed by variously selecting the kind and amount of the curing agent, the kind of the thermosetting resin, and the kind and amount of the curing accelerator. It will be easy for one skilled in the art to determine the kinds and amounts of the thermosetting resin, the curing agent and the curing accelerator, in accordance with the desired curing conditions. In the invention, a compound having two or more phenolic hydroxyl groups is preferred as the curing agent. Such compounds include the above-mentioned polyphenols and bisphenol A, such as phenol novolak, cresol novolak, bisphenol A novolak, aralkyl type phenol novolak, a triphenylmethane type phenol resin, a terpenephenol resin, naphthol novolak and a phenol dicyclopentadiene resin. The curing agent having two or more phenolic hydroxyl groups can provide a molded article having high heat resistance.

Any one kind of the following (i) to (v) is used as the curing accelerator:

(i) a phosphorus compound represented by the following general formula (I) or (II) and having a molecular weight of 300 to 1,000:

[Chem. 2]

wherein R1 to R4 are the same or different and represent each a functional group selected from hydrogen, an alkyl group, an aralkyl group and an aryl group or a derivative thereof; and X is a substance selected from a tetradentate boron compound, a halogen atom, and a hexadentate antimony compound;

(ii) a salt of a diazabicyclo compound with an organic acid;

(iii) a urea derivative represented by the general formula "X—NH—CO—NYZ, in which X is one member selected from a saturated or unsaturated alkyl group and a derivative thereof and an aryl group and a derivative thereof, and Y and Z may be the same or different and are each a saturated or unsaturated alkyl group";

(iv) an imidazole compound having a molecular weight of 100 or more; and (v) a tertiary amine compound having a molecular weight of 120 to 1,000.

Of these, an alkyl-based urea derivative represented by the general formulae (I), (II) or (III) is preferred:

[Chem. 3]

General formula (I)

wherein, $R_1$ and $R_2$ are each hydrogen, halogen, a lower alkyl group, a lower alkoxy group or a nitro group and may be the same or different; and $R_3$ and $R_4$ may be the same or different and are each a lower alkyl group;

[Chem. 4]
General formula (II)

wherein, $R_1$ and $R_2$ are each hydrogen, halogen, a lower alkyl group, a lower alkoxy group or a nitro group and may be the same or different; and $R_3$, $R_4$, $R_5$ and $R_6$ may be the same or different and are each a lower alkyl group;

[Chem. 5]

General formula (III)

wherein $R_1$, $R_2$, $R_3$ and $R_4$ may be the same or different and are each a lower alkyl group.

In the above-mentioned each alkyl-based urea derivative, as the lower alkyl group or the lower alkoxy group, a methyl group, an ethyl group, a propyl group and a butyl group or alkoxy groups corresponding thereto are preferred.

Specific examples of the alkyl-based urea derivative represented by the above-mentioned general formula (I) include 3-phenyl-1,1-urea, 3-(p-chlorophenyl)-1,1-urea, 3-(3,4-dichlorophenyl)-1,1-urea, 3-(o-methylphenyl)-1,1-urea, 3-(p-methylphenyl)-1,1-urea, 3-(methoxyphenyl)-1,1-urea, 3-(nitrophenyl)-1,1-urea.

Moreover, specific examples of the alkyl-based urea derivative represented by the above-mentioned general formula (II) include 1,1'-phenylenebis(3,3-urea), 1,1'-(4-methyl-m-phenylene)-bis(3,3-urea).

Furthermore, specific examples of the alkyl-based urea derivative represented by the above-mentioned general formula (III) include N,N"-(1,5,5-trimethyl-1,3-cyclohexanedyl)bis[N',N'-trimethylurea].

Of the above-mentioned ones, the compounds of the following (1), (2) and (3) are particularly preferred.

[Chem. 6]

Since the heat stability at 60 to 140° C. is vastly improved by incorporating the above-mentioned alkyl-based urea derivative, the curing reaction does not occur during the time of melt kneading for homogenization even when the melt kneading is performed at the preparation of the resin composition, so that the fluidity of the molding material is drastically enhanced. Also, although the inside of the cylinder is heated to around 100° C. in the injection molding, curing does not occur even at such a temperature as mentioned above, that is to say, curing does not proceed in the inside of the cylinder, a mold can be highly filled with the molding material, and the material is rapidly cured in the inside of the mold, so that the resulting molded article has high strength. As mentioned above, in the resin composition of the invention, injection molding is made possible and productivity is improved.

The carbon material is a conductive material mainly composed of carbon atoms, and specifically, it means but is not limited to expanded graphite, artificial graphite, natural graphite, carbon black, carbon fiber, carbon nanofiber, carbon nanotube, diamond-like carbon, fullerene, carbon nanohorn, hard carbon or glass-like carbon.

Of these, natural graphite is a naturally occurring carbon material. Accordingly, metal components such as iron, calcium and sodium are contained in large amounts as natural product-derived impurities, so that these promote deterioration of an electrolyte membrane of a fuel cell in some cases. It is therefore unpreferred to increase the ratio of natural graphite in the resin composition of the invention. Expanded graphite is a graphite material obtained by processing natural graphite, and easily forms conductive paths due to its anisotropy to be able to obtain a composition excellent in conductivity. However, since a natural product-derived raw material is used, similarly to natural graphite, deterioration of the electrolyte membrane with the metal components is promoted in some cases.

Accordingly, in the invention, high crystalline artificial graphite having an average particle size of 100 μm or more and less than 150 μm is used as a main component of the carbon material. The carbon material may be entirely composed of the high crystalline artificial graphite having an average particle size of 100 μm or more and less than 150 μm, or may be used in combination with the above-mentioned different carbon material. That is to say, the ratio of the high crystalline artificial graphite having an average particle size of 100 μm or more and less than 150 μm in the whole carbon material is preferably from 5 to 100% by mass.

The high crystalline artificial graphite means artificial graphite having a narrow graphite plane distance. The graphite plane distance as used herein is an index for representing a crystalline state of the graphite, and a smaller value indicates that a crystal is more developed. The graphite crystals take a configuration of a hexagonal net-like plane, and the graphite developed in the crystals becomes a state in which spreading in a crystal plane direction is large and lamination in a longitudinal direction is dense. The graphite plane distance is a value measured with the distance between the planes of the graphite crystals averaged.

The perfect crystal of graphite has a graphite plane distance of 0.3354 nm. However, when the value of the graphite plane distance is low, anisotropy of graphite particles becomes high because of crystal growth in the plane direction. The graphite crystals flows well in a direction parallel to the hexagonal net-like crystal plane, but is difficult to flow in a perpendicular direction. Accordingly, one having a large crystal plane is improved in conductivity. The same applies to a molding material obtained by mixing graphite and a resin, and one using graphite in which crystals have grown is improved in conductivity. Accordingly, from the viewpoint of conductivity, the crystal plane distance has a preferred range. The preferred range in the invention is from 0.3354 nm to 0.3362 nm, and the more preferred range is from 03354 nm to 0.3360 nm.

The graphite crystal plane distance is measured by XRD (X-ray diffraction), and calculated from the angle (2θ) at which a peak of a 002 plane as a basal plane is confirmed. Specifically, it is calculated by the Bragg equation λ=2d·sin θ. At this time, d is the plane distance, θ is [½] of the peak angle, and λ is the wavelength of an optical system of an XRD apparatus. A method for calculating the plane distance from the results measured by XRD is known information which can be easily analogized by one skilled in the art who handles inorganic materials.

As the graphite having such a crystal plane distance, there is artificial graphite obtained by burning needle coke. The needle coke is calcined coke having extremely strong anisotropy, which partially has a lamellar crystal structure that is a crystal structure characteristic of the graphite, and when pulverized, it is split into an elongated form in a direction perpendicular to a crystal layer to form elongated acicular particles. It is therefore called needle coke. In the needle coke, the graphite crystal structure is completed to some degree, so that it can be easily graphitized, and has been utilized in large amounts in the production of graphite electrodes for steel making which allow large electric currents to flow.

As a typical method for producing the needle coke, there is the following method. Aromatic-rich, particularly polycyclic aromatic-rich coal tar, coal tar pitch or petroleum-derived heavy oil is subjected to an impurity removal treatment, and then, slowly coked by a delayed coker at 300 to 700° C. to form green coke containing about 7 to 15% by mass of volatile matter. Thereafter, this is calcined at a temperature of about 1,000 to 1,500° C. to increase the carbon content to 98 to 99% by mass, thereby producing the needle coke. Then, the needle coke thus obtained is burned at a temperature of 2,000 to 3,000° C., thereby obtaining the above-mentioned high crystalline artificial graphite.

When the needle coke is graphitized, the configuration of the needle coke is not limited. For example, graphitization may be performed in a state where the needle coke is formed into an appropriate shape, followed by pulverization, or a needle coke powder may be burned as it is. The needle coke is calcined coke scarcely containing volatile matter, so that it shows no fusion bonding properties even when heated to the graphitization temperature. Accordingly, the needle coke can be graphitized by burning it immediately after pulverization. The artificial graphite may be produced by kneading the needle coke with binder pitch, molding the resulting kneaded product by an appropriate means such as extrusion or compression molding, and graphitizing the molded article, followed by pulverization.

Moreover, it is necessary to use one having an average particle size within the specific range as the high crystalline artificial graphite. When the average particle size is too small, the compound viscosity becomes high, resulting in deterioration of dimensional accuracy of the fuel cell separator or failure to secure fluidity necessary for injection molding. On the other hand, when the average particle size is too large, graphite particles cannot pass through a portion having a small thickness in a mold cavity because of interference between the mold cavity and the graphite particles. Accordingly, the graphite and the resin are unevenly distributed in the molded article and a portion having high electric resistance is locally formed. Consequently, the high crystalline artificial graphite having an average particle size of 100 μm or more and less than 150 μm is used in the invention. Particularly, when the separator is molded by injection molding, the mold cavity is filled with the molding material together with flowing from a specific direction, so that the above-mentioned graphite and resin tend to be unevenly distributed in the molded article. The generation of the portion having local high electric resistance formed thereby is remarkable in the case where the thickness of a portion at which the separator has smallest thickness (thinnest portion) is small. For example, when the thickness of the thinnest portion falls within the range of 0.2 to 0.7 mm, particularly the range of 0.3 to 0.6 mm, the problem can be avoided by using graphite having a particle size of the invention.

The average particle size used in the invention means the average particle size measured with a laser diffraction type particle size distribution analyzer. When particles dispersed in a liquid of water are irradiated with a laser beam, the scattered (diffracted) light is generated from the particles. The intensity of the scattered light depends on the particle size parameter and the refractive index of the particles. The laser diffraction method is a method of measuring the distribution of intensity of the scattered light to determine the particle size distribution. The measuring apparatus is commercially available, for example, from Shimadzu Corporation or Horiba, Ltd.

Moreover, one obtained by extrusion molding the needle coke together with binder pitch and graphitizing the molded article has strong orientation, so that a molding material having low electric resistance can be obtained. High crystalline graphite is often used as an electrode material used in electric steel making, and a cut powder generated in cutting it can also be used. The high crystalline graphite thus obtained is pulverized and classified as needed to obtain the powder having the above-mentioned particle size.

Although most artificial graphite powders generally commercially available have an average particle size of 100 μm or less, they usually have certain particle size distribution, and particles having a particle size exceeding 100 μm are also contained. Accordingly, of commercially available products, one having a maximum average particle size may be got and classified to obtain the artificial graphite having a desired average particle size. Moreover, a commercially available electrode material may be pulverized.

Furthermore, the high crystalline artificial graphite is extremely high in anisotropy, so that it takes a tabular form or an acicular form in many cases. For this reason, in addition to high conductivity of the high crystalline graphite itself, it easily forms conductive paths when mixed with the resin, thereby being able to obtain a high-conductive fuel cell separator.

As for the compounding ratio of the above-mentioned respective components in the resin composition, the amount of the carbon material is required to be from 50 to 85% by mass based on the total amount of the resin composition. When the ratio of the carbon material is too low, conductivity decreases. On the other hand, when the ratio of the carbon material is too high, strength decreases and fluidity of the compound decreases. Accordingly, in injection molding, the pressure distribution of the resin composition in a mold becomes broad, so that the dimensional accuracy of the fuel cell separator obtained is deteriorated and hence the case is not preferable. Further, the curing accelerator is blended at a ratio of 0.1 to 20 parts by weight, preferably at a ratio of 5 to 15 parts by weight, based on 100 parts by weight of the curing agent. When the amount of the curing accelerator blended is less than the lower limit, it takes a long period of time to perform curing in the mold. When it exceeds the upper limit, there is a fear of impairing heat stability in the vicinity of 100° C.

Moreover, it is also possible to add a lubricant such as carnauba wax to the resin composition as an optional component to prevent sticking to the mold or a kneader at the time of molding processing. As the lubricant, there can also be used stearic acid, montanic acid wax or a metal salt thereof. It is also possible to add an inorganic filler such as glass fiber, silica, talc, clay or calcium carbonate, an organic filler such as wood flour or a plasticizer, to the extent that does not deteriorate the conductivity.

In the invention, melt mixing is preferred for the production of the resin composition. The epoxy resin or the curing agent is softened at a temperature equal to or higher than a certain temperature. This temperature at which the resin or the agent is softened is called the softening point. In the invention, mixing may be performed in an apparatus adjusted to a temperature equal to or higher than the softening temperature of either the epoxy resin or the curing agent and at which the curing reaction does not proceed during mixing. Specifically, for the epoxy resin or the curing agent described above, the temperature is preferably from 50 to 120° C., more preferably from 70 to 100° C., and still more preferably from 80 to 90° C. Further, the kneading time is preferably from 30 seconds to 5 minutes, and more preferably from 1 to 3 minutes.

In the case of an apparatus in which a strong shear action is generated, the preset temperature may be a temperature equal to or lower than the softening temperature. In such an apparatus, the temperature of the mixture is increased to a temperature equal to or higher than the softening temperature by shear heat generation in some cases. When either the epoxy resin or the curing agent is liquid at ordinary temperature, mixing may be performed at ordinary temperature.

As the apparatus used for mixing, various conventional apparatus can be used. Examples thereof include but are not limited to a non-pressure kneader, a pressure kneader, a twin-screw extruder, a single-screw extruder, a Banbury mixer, an intermixer, a two-roll mill, a three-roll mill and the like. Further, the material preliminarily mixed by dry mixing may be melt mixed.

In the above-mentioned melt mixing, mixing can be performed by putting all components in the apparatus at once, so that the mixing is advantageous in production cost.

The invention also provides the fuel cell separator obtained by molding the above-mentioned resin composition. As a molding method, there is used injection molding excellent in productivity. In injection molding, it is necessary to use a molding material having high fluidity. However, in the resin composition of the invention, since the carbon material contains the high-conductive high crystalline artificial graphite as described above, it requires only a small content thereof. Furthermore, the amount of the curing accelerator is decreased, so that the proceeding of the curing reaction at a cylinder temperature is inhibited, which makes injection molding possible. One example of injection molding conditions is shown below.

The cylinder temperature is set so that it gradually increases from under a hopper to a nozzle. The preset temperature under the hopper is preferably from 30 to 80° C., and more preferably from 40 to 60° C. When the temperature under the hopper is too high, the resin composition flow back in a cylinder at the time of injection molding to result in failure to fill the cavity of the mold in some cases. Moreover, when the temperature under the hopper is too low, the resin composition transferred to a leading edge of the cylinder with a screw does not sufficiently melt to result in failure to fill the cavity of the mold due to poor fluidity in some cases. On the other hand, the temperature of the nozzle portion is preferably from 50 to 120° C., and more preferably from 70 to 100° C. When the temperature of the nozzle portion is too high, the epoxy resin is cured in the cylinder to result in failure to inject the resin composition from the cylinder in some cases. Moreover, when the temperature of the nozzle portion is too low, the resin composition does not sufficiently melt to result in failure to fill the cavity of the mold due to poor fluidity.

The mold temperature is preferably from 150 to 200° C., and more preferably from 160 to 190° C. When the mold temperature is too low, the resin composition is poor in fluidity to cause the occurrence of the case where the cavity of the mold cannot be filled or to take a long period of time for curing. Moreover, when the mold temperature is too high, the time from the start of injection into the mold to the stop of flow caused by curing becomes short, resulting in failure to fill the cavity of the mold with the resin composition in some cases.

The injection pressure can be from 10 to 250 MPa, and the curing time can be from 20 seconds to 10 minutes. However, similarly to the cylinder temperature and the mold temperature, conditions may be appropriately set depending on the kinds of epoxy resin, curing agent and curing accelerator used, the shape of fuel cell separator, and the like. It is also possible to perform cutting processing after molding as needed.

As described above, important points of the invention are to use the specific artificial graphite, to use and melt mix the specific curing accelerator in a prescribed amount in combination with the graphite, and further to mold the resulting resin composition by injection molding. There may be considered as follows the reason why the resin composition excellent in conductivity and fluidity is obtained by the specific artificial graphite and the specific curing accelerator.

In general, when a filler is dispersed in a matrix, a larger average particle size of the filler results in a larger average distance between particles of the filler and a smaller total surface area of the filler, assuming that the volume ratio is the same. Accordingly, interactions between particles of the filler such as friction, cohesive force and repulsive force and filler-matrix interactions such as adsorption of a matrix component to filler surfaces decrease, resulting in a decrease in viscosity of the whole matrix filled with the filler. In the invention, the filler indicates the graphite, and the matrix indicates the resin. Accordingly, the use of the large particle size graphite makes it possible to easily obtain the low-viscosity resin composition.

The high crystalline artificial graphite powder generally has anisotropy in its particle, is a tabular or acicular powder in its form, and is easily split by a shear action to form fine particles. Accordingly, when used as the fuel cell separator, it is easily reduced in particle size by shear acting at the time of a kneading operation with the resin in the compound production, transfer with the screw in the cylinder of the injection molding machine in molding, and filling into the mold. For this reason, breakage of conductive path formed by the graphite particles comes to easily occur. In the invention, the use of the large particle size artificial graphite and the specific curing accelerator prevents the occurrence.

Furthermore, when the large particle size artificial graphite is used, shear stress is decreased at the time of the above-mentioned kneading operation and injection molding, because of low viscosity of the resin composition. As a result, shear heat generation becomes difficult to occur. When heat generation occurs, the curing reaction proceeds, although the degree varies depending on the kind of the curing accelerator. Accordingly, the viscosity further increases, which causes a vicious cycle that the amount of shear heat generation increases to lead to further progress of the curing reaction.

When no high crystalline artificial graphite is used and low crystalline artificial graphite or carbon black is used instead, the use of a specific curing accelerator in a specified amount can also provide a resin composition not curing at the time of melt mixing or in the screw and excellent in heat stability. However, in order to obtain the same conductivity as in the case of using the high crystalline artificial graphite, it is necessary to add the low crystalline artificial graphite or carbon black in large amounts. Accordingly, the amount of the resin, which improves fluidity of the resin composition, decreases, and the amount of the carbon material used, which decreases fluidity, increases, resulting in a decrease in fluidity of the resin composition to substantially deteriorate formability.

Moreover, in the case of dry mixing, fracture of the graphite by kneading is difficult to occur, and a resin composition excellent in conductivity is obtained. However, viscosity is exceedingly high for performing injection molding, so that it becomes impossible to fill the resin composition into the mold. In contrast to this, when the specific artificial graphite and the specific curing accelerator in the specified amount are used in combination, these problems are solved. When the specific curing accelerator is used in the specified amount, the curing reaction of the resin composition is difficult to proceed at a low temperature of 100° C. or less which is assumed at the time of kneading or in the cylinder of injection molding. It becomes therefore possible to suppress shear force to be loaded on the compound. When the shear force is suppressed, pulverization of the graphite is minimized.

In addition, in the invention, the high crystalline artificial graphite having an average particle size within the specific range which is suitable for injection molding is used, thereby further securing the fluidity necessary for injection molding to make it compatible with conductivity. When the graphite deviated from this range is used, fluidity of the resin composition is insufficient, so that it is necessary to increase the resin amount ratio of the composition. In that case, since conductivity is insufficient, the resulting material is a material having a problem in characteristics as the fuel cell separator is obtained.

That is to say, when the specific curing accelerator is used in an amount more than the specified amount, the high crystalline artificial graphite is pulverized, and the conductive paths are difficult to be formed. However, when the curing accelerator is used in the specified amount, the high crystalline artificial graphite is not pulverized, and the conductive paths become easy to be formed. As a result, the resin amount can be increased in the resin composition to increase fluidity, thereby substantially improving dimensional accuracy of the molded article, and making it possible to perform injection molding excellent in productivity.

EXAMPLES

The following will illustrate the invention in greater detail with reference to Examples and Comparative Examples, but the invention should not be construed as being limited thereby.

(Preparation of Molding Material)

According to the formulations shown in Table 1, 500 g of the materials in total were preliminarily mixed in a 10-liter Henschel mixer, and then, kneaded in a 1-liter pressure kneader at a chamber temperature of 100° C. for 5 minutes. The resulting product was pulverized with a pulverizer to particles having a particle size of about 2 mm to form a molding material, and then injection molding was performed. Units in the formulations in Table 1 are expressed in percentages by mass.

Incidentally, artificial graphite having an average particle size of 130 μm is hardly commercially available. Accordingly, a residue obtained by passing a commercially available artificial graphite powder having an average particle size of 100 μm through a 200-mesh sieve was used in each Example, and the commercially available artificial graphite powder was used without modification in each Comparative Example. Moreover, the crystal plane distance of a graphite raw material was determined by measuring the crystal plane distance of a raw material graphite powder at a step width of 0.01 deg and a scan speed of 0.3 sec/step, using an X-ray diffractometer (manufactured by Rigaku Corporation), from a 2θ position of a 002 plane peak as a maximum peak observed in the vicinity of 2θ=25 to 30 deg. Furthermore, the average particle size of the graphite raw material was determined by measuring the average particle size of the graphite powder using a laser diffraction type particle size distribution analyzer (manufactured by Shimadzu Corporation).

Moreover, the urea derivative 2 and the urea derivative 3 are the following compounds, respectively.

[Chem. 7]

(Urea derivative 2)

(Urea derivative 3)

(Preparation of Flat Molded Article)

Using as an injection molding machine a molding machine for thermosetting resins (manufactured by Hishiya Seiko Co., Ltd.) having a mold clamping force of 80 t, the cylinder temperature was set to 50° C. under a hopper, the nozzle to 90° C., the mold temperature to 170° C., the injection rate to 20 mm/sec, and the curing time to from 60 to 180 seconds. The molding pressure was appropriately set within the range of 30 to 70 MPa. Using this injection molding machine, the molding material was injection molded into a square thin tabular form having a length of 100 mm on one side and a thickness of 2 mm. The resulting molded article was subjected to cut processing to form a test specimen.

(Evaluation of Conductivity)

Figure 2:
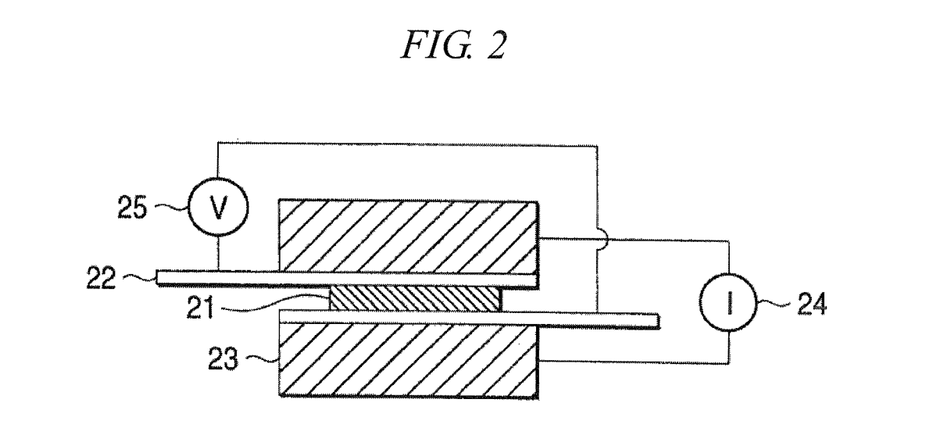
FIG. 2 is a schematic view illustrating a method for measuring the resistance in a penetrating direction.

The resistance in a penetrating direction was measured by the method shown in FIG. 2 to make the evaluation of conductivity. A sample 21 was set between electrodes 23 with the interposition of carbon papers 22. The electric resistance was calculated from the current allowed to flow between the electrodes (measured with an ammeter 24) and the voltage between the carbon papers (measured with a voltmeter 25), and further multiplied by the area of the sample to obtain the resistance in the penetrating direction. The results thereof are shown together in Table 1.

(Evaluation of Heat Stability: Measurement of Progress of Curing Reaction at 100° C.)

Using a moving die rheometer (Monsanto MDR2000), changes in torque associated with the progress of curing reaction of the molding material at 100° C. were measured. The measuring time was 15 minutes. An increase in torque indicates the progress of curing. The results thereof are shown together in FIG. 1. In Table 1, for one in which an obvious increase in torque was observed, "poor" is described in a column of heat stability.

(Evaluation of Fluidity: Viscosity Measurement)

In accordance with JIS-K-7199, using a capillary rheometer (Capillograph manufactured by Toyo Seiki Seisaku-sho Ltd.), the viscosity of the molding material at the time of 170° C. and a shear rate of 1,000 sec$^{-1}$ before an increase in viscosity due to the curing reaction was observed was measured. The results thereof are shown together in Table 1.

(Evaluation of Unevenly Distributed State of Resin/Graphite in Molded Article)

A groove-shaped molded article in which 50 ribs having a width of 1 mm and a height of 1 mm were provided on one side of a flat plate having a projection shape of 100×100 and a thickness of 0.5 mm was molded by injection molding under the same conditions as those in the case of the above-mentioned flat molded article except that a mold having side gates perpendicular to the ribs was used. Nine pieces of a test specimen having a size of 30 mm×30 mm were cut out from the resulting groove-shaped molded article, and conductivity was measured by the above-mentioned method. An unevenly distributed state of resin/graphite was evaluated from the maximum value and the minimum value of the nine pieces of the test specimen sampled from the same plane. It is judged that the uneven distribution of resin/graphite more hardly occurs when the difference in electric resistance is smaller and thus the case is preferable. The results thereof are shown together in Table 1.

(Measurement of Impurities in Molded Article)

In accordance with JIS R7212, the ash content in the molded article was measured. The results thereof are shown together in Table 1.

high crystalline artificial graphite having an average particle size of 50 μm was used in Comparative Example 2, the high crystalline artificial graphite having an average particle size of 180 μm was used in Comparative Example 3, the usual artificial graphite having an average particle size of 130 μm was used in Comparative Example 4, and the expanded graphite was used in Comparative Example 5.

As a result, from the fact that changes in torque at 100° C. scarcely occur in respective Examples, the progress of the curing reaction is very slow at 100° C., and the molding materials are excellent in heat stability. Also, the materials are low in viscosity and thus it is possible to obtain molded articles by injection molding. This is assumed to be because heat stability is high and hence an increase in viscosity associated with the progress of the curing reaction at the kneading temperature or the cylinder temperature is difficult to occur, thereby preventing fracture of the high crystalline artificial graphite in the kneading process or the molding process. Furthermore, since electric resistance is low, there is little fear of a decrease in efficiency associated with voltage loss of internal resistance at the time of electric generation, in the case of the use as the fuel cell separator. Moreover, even in the shape having ribs provided thereon, the difference between

TABLE 1

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Formulation | Epoxy Resin | 12.1 | 11.3 | 12.1 | 12.1 | 12.1 | 12.1 | 12.1 | 12.1 | 12.1 | 12.1 |
| | Phenol Novolak | 6.1 | 5.7 | 6.1 | 6.1 | 6.1 | 6.1 | 6.1 | 6.1 | 6.1 | 6.1 |
| | Urea-based Curing Accelerator 1 | 1.2 | 2.4 | | | 1.2 | | 1.2 | 1.2 | 1.2 | 1.2 |
| | Urea-based Curing Accelerator 2: Chemical Formula (2) | | | 1.2 | | | | | | | |
| | Urea-based Curing Accelerator 3: Chemical Formula (3) | | | | 1.2 | | | | | | |
| | Triphenylphosphine | | | | | | 1.2 | | | | |
| | Artificial Graphite 1 | 77.7 | 77.7 | 77.7 | 77.7 | | 77.7 | | | | |
| | Artificial Graphite 2 | | | | | 77.7 | | | | | |
| | Artificial Graphite 3 | | | | | | | 77.7 | | | |
| | Artificial Graphite 4 | | | | | | | | 77.7 | | |
| | Artificial graphite 5 | | | | | | | | | 77.7 | |
| | Expanded graphite | | | | | | | | | | 77.7 |
| | Lubricant | 2.9 | 2.9 | 2.9 | 2.9 | 2.9 | 2.9 | 2.9 | 2.9 | 2.9 | 2.9 |
| Test results | Viscosity @ 170° × 100 sec$^{-1}$ (Pa·s) | 99 | 92 | 98 | 92 | 142 | 195 | 280 | 73 | 88 | 193 |
| | Resistance in Penetrating Direction (mΩ·cm$^2$) | 9.5 | 9.7 | 9.0 | 9.8 | 9.0 | 53.0 | 9.6 | 9.8 | 12.1 | 8.9 |
| | Maximum Value of Groove-shape Electric Resistance (mΩ·cm$^2$) | 13.3 | 13.2 | 13.3 | 13.6 | 13.0 | 65.5 | 12.4 | 11.5 | 15.7 | — |
| | Minimum Value of Groove-shape Electric Resistance (mΩ·cm$^2$) | 16.1 | 16.8 | 13.5 | 16.1 | 14.9 | 91.3 | 16.5 | 23.2 | 18.6 | — |
| | Ash Content (%) | <0.1 | <0.1 | <0.1 | <0.1 | <0.1 | <0.1 | <0.1 | <0.1 | <0.1 | 0.42 |
| | Heat Stability | Good | Good | Good | Good | Good | Poor | Good | Good | Good | — |

Epoxy Resin: Orthocresol novolak type epoxy resin EOCN-103S manufactured by Nippon Kayaku Co., Ltd., softening temperature: 81 to 85° C.
Phenol Novolak: Resitop PSM4324 manufactured by Gunei Chemical Industry Co., Ltd., softening temperature: 98 to 102° C.
Urea-based Curing Accelerator 1: Special grade reagent, 3-(3,4-dichlorophenyl)-1,1-dimethylurea
Artificial Graphite 1: A residue obtained by passing SGP-100 μm manufactured by SEC (artificial graphite obtained by burning needle coke, average particle size: 100 μm) through a 200-mesh sieve, average particle size: 130 μm, plane distance: 0.3357 nm
Artificial Graphite 2: SGP-100 μm manufactured by SEC (artificial graphite obtained by burning needle coke, average particle size: 100 μm, plane distance: 0.3357 nm)
Artificial Graphite 3: SGP-50 μm manufactured by SEC (artificial graphite obtained by burning needle coke, average particle size: 50 μm, plane distance: 0.3357 nm)
Artificial Graphite 4: A residue obtained by passing SGP-100 μm manufactured by SEC (artificial graphite obtained by burning needle coke, average particle size: 100 μm) through a 100-mesh sieve, average particle size: 180 μm, plane distance: 0.3357 nm
Artificial Graphite 5: A residue obtained by passing SGL-90 μm manufactured by SEC (artificial graphite obtained by burning massive coke, average particle size: 90 μm) through a 200-mesh sieve, average particle size: 130 μm, plane distance: 0.3365 nm
Expanded Graphite: FL 300 manufactured by Nippon Carbon Co., Ltd.
Lubricant: Carnauba wax In all of respective Examples and Comparative Examples, there are used the orthocresol novolak type epoxy resin and the phenol novolak as the curing agent. In respective Examples, a specific urea derivative is used as the curing accelerator, and the high crystalline artificial graphite having an average particle size of 130 μm or 100 μm is used as the carbon material. In contrast to this, triphenylphosphine was used as the curing accelerator in Comparative Example 1, the the maximum value and the minimum value of electric resistance is small and thus the uneven distribution of resin/graphite scarcely occurs.

Comparative Example 1 using triphenylphosphine as the curing accelerator is slightly inferior in heat stability and electric resistance to other Examples, and electric resistance and viscosity are high. Comparative Example 2 is excellent in heat stability and low in electric resistance of the molded article, but high in viscosity and is therefore unsuitable as the material for injection molding. Comparative Example 3 is excellent in heat stability and both electric resistance and viscosity are excellent, but the uneven distribution of resin/graphite is confirmed, so that Comparative Example 3 has a problem. Comparative Example 4 is slightly high in electric resistance and further it is anticipated that viscosity increases when the graphite ratio is increased for lowering the electric resistance. Comparative Example 5 is low in electric resistance, but high in viscosity. Moreover, the ash content is large, so that there is also the possibility of imparting damage to an electrolyte membrane.

It is apparent from the above that the fuel cell separator excellent in conductivity and formability and containing little impurities is obtained by the invention.

While the invention has been described in detail and with reference to specific embodiments thereof, it will be apparent to one skilled in the art that various changes and modifications can be made therein without departing from the spirit and scope thereof.

The present application is based on Japanese Patent Application No. 2008-199277 filed on Aug. 1, 2008, and the contents are incorporated herein by reference.

DESCRIPTION OF REFERENCE NUMERALS AND SIGNS

10: Fuel Cell Separator
11: Flat Plate Portion
12: Partition Walls
13: Channels
21: Sample
22: Carbon Paper
23: Electrode
24: Ammeter
25: Voltmeter

The invention claimed is:

1. A fuel cell separator resin composition comprising, as essential components:
   (A) an epoxy resin;
   (B) a curing agent;
   (C) a curing accelerator; and
   (D) a carbon material,
   wherein the content of the (D) is from 50 to 85% by mass based on the total amount of the composition,
   wherein the (D) comprises high crystalline artificial graphite having an average particle size of 100 μm or more and less than 150 μm in an amount of 5 to 100% by mass based on the total amount of the (D),
   wherein the content of the (C) is from 0.1 to 20 parts by weight per 100 parts by weight of the (B), and
   wherein the (C) is a urea derivative represented by the general formula (I), (II) or (III):

General formula (I)

wherein, $R_1$ and $R_2$ are each hydrogen, halogen, a lower alkyl group, a lower alkoxy group or a nitro group and may be the same or different; and $R_3$ and $R_4$ may be the same or different and are each a lower alkyl group;

General formula (II)

wherein $R_1$ and $R_2$ are each hydrogen, halogen, a lower alkyl group, a lower alkoxy group or a nitro group and may be the same or different; and $R_3$, $R_4$, $R_5$ and $R_6$ may be the same or different and are each a lower alkyl group;

General formula (III)

wherein $R_1$, $R_2$, $R_3$ and $R_4$ may be the same or different and are each a lower alkyl group.

2. The fuel cell separator resin composition according to claim 1, wherein the (C) is a urea derivative represented by the following chemical formula (1), (2) or (3)

(1)

(2)

-continued (3)

3. The fuel cell separator resin composition according to claim 1, wherein the (B) has two or more phenolic hydroxyl groups in the molecule thereof.

4. The fuel cell separator resin composition according to claim 1, wherein the (A) is a multifunctional epoxy resin.

5. The fuel cell separator resin composition according to claim 1, wherein the high crystalline artificial graphite has a crystal plane distance of 0.3354 nm to 0.3362 nm.

6. The fuel cell separator resin composition according to claim 1, wherein the high crystalline artificial graphite is one obtained by burning needle coke.

7. A method for producing the fuel cell separator resin composition according to claim 1, said method comprising performing melt kneading of the (A) to (D) at a temperature equal to or higher than a softening temperature of the (A) or the (B) and at a temperature at which a curing reaction does not proceeds during mixing.

8. A fuel cell separator produced by injection molding of the fuel cell separator resin composition according to claim 1.

* * * * *